(12) United States Patent
Castelucci et al.

(10) Patent No.: US 10,591,210 B2
(45) Date of Patent: Mar. 17, 2020

(54) AIR PURIFICATION UNITS

(71) Applicant: Highview Enterprises Limited, London (GB)

(72) Inventors: Nicola Castelucci, Woking (GB); Richard Riley, London (GB)

(73) Assignee: Highview Enterprises Limited, London (GB)

( * ) Notice: Subject to any disclaimer, the term of this patent is extended or adjusted under 35 U.S.C. 154(b) by 84 days.

(21) Appl. No.: 15/314,019

(22) PCT Filed: May 28, 2015

(86) PCT No.: PCT/GB2015/051554
§ 371 (c)(1),
(2) Date: Nov. 25, 2016

(87) PCT Pub. No.: WO2015/181553
PCT Pub. Date: Dec. 3, 2015

(65) Prior Publication Data
US 2017/0191752 A1 Jul. 6, 2017

(30) Foreign Application Priority Data

May 30, 2014 (GB) .................................. 1409669.7
Mar. 30, 2015 (GB) .................................. 1505455.4

(51) Int. Cl.
*F25J 3/04* (2006.01)
*F25J 1/00* (2006.01)
(Continued)

(52) U.S. Cl.
CPC .......... *F25J 3/04387* (2013.01); *B01D 53/02* (2013.01); *B01D 53/047* (2013.01);
(Continued)

(58) Field of Classification Search
CPC ........ B01D 2259/403; B01D 2259/404; B01D 2259/41; B01D 53/02; B01D 53/0462;
(Continued)

(56) References Cited

U.S. PATENT DOCUMENTS 3,377,812 A   4/1968   Garrett et al.
5,661,987 A   9/1997   Zarate
(Continued)

FOREIGN PATENT DOCUMENTS

CN   1132105 A    10/1996
CN   101427007 A   5/2009
(Continued)

OTHER PUBLICATIONS

International Search Report for International Application No. PCT/GB2015/051554 dated Feb. 12, 2016.
(Continued)

*Primary Examiner* — Edward F Landrum
*Assistant Examiner* — Chang H. Park
(74) *Attorney, Agent, or Firm* — Thomas B. Ryan; Andrew J. Anderson, Esq.; Harter Secrest & Emery, LLP

(57) ABSTRACT

A liquid air energy storage system comprises an air liquefier, a storage facility for storing the liquefied air, and a power recovery unit coupled to the storage facility. The air liquefier comprises an air input, an adsorption air purification unit for purifying the input air, and a cold box for liquefying the purified air. The power recovery unit comprises a pump for pressurising the liquefied air from the liquid air storage facility, an evaporator for transforming the high-pressure liquefied air into high-pressure gaseous air, an expansion turbine capable of being driven by the high-pressure gaseous air, a generator for generating electricity from the expansion turbine, and an exhaust for exhausting low-pressure gaseous air from the expansion turbine. The exhaust is coupled to the adsorption air purification unit such that at least a portion of the exhausted low-pressure gaseous air is usable to regenerate the adsorption air purification unit.

37 Claims, 12 Drawing Sheets

(51) Int. Cl.
*F25J 1/02* (2006.01)
*B01D 53/04* (2006.01)
*B01D 53/047* (2006.01)
*F01K 5/00* (2006.01)
*B01D 53/02* (2006.01)
*F01K 21/00* (2006.01)
*F01K 25/00* (2006.01)
*F16D 31/02* (2006.01)
*F25J 3/08* (2006.01)

(52) U.S. Cl.
CPC ............ *B01D 53/0462* (2013.01); *F01K 5/00* (2013.01); *F01K 21/00* (2013.01); *F01K 25/00* (2013.01); *F16D 31/02* (2013.01); *F25J 1/0012* (2013.01); *F25J 1/0045* (2013.01); *F25J 1/02* (2013.01); *F25J 1/0242* (2013.01); *F25J 1/0251* (2013.01); *F25J 3/08* (2013.01); B01D 2259/403 (2013.01); B01D 2259/404 (2013.01); B01D 2259/41 (2013.01); *F25J 2205/24* (2013.01); *F25J 2205/60* (2013.01); *F25J 2205/64* (2013.01); *F25J 2205/66* (2013.01); *F25J 2205/68* (2013.01); *F25J 2230/04* (2013.01); *F25J 2230/30* (2013.01); *F25J 2230/40* (2013.01); *F25J 2235/02* (2013.01); *F25J 2240/10* (2013.01); *F25J 2240/90* (2013.01); *F25J 2245/40* (2013.01); *F25J 2245/90* (2013.01)

(58) Field of Classification Search
CPC ................. B01D 53/047; B01D 53/00; B01D 2259/402; B01D 2259/406; F01K 21/00; F01K 25/00; F01K 5/00; F16D 31/02; F25J 1/0012; F25J 1/0045; F25J 1/02; F25J 1/0242; F25J 1/0251; F25J 2205/24; F25J 2205/60; F25J 2205/64; F25J 2205/66; F25J 2205/68; F25J 2230/04; F25J 2230/30; F25J 2230/40; F25J 2235/02; F25J 2240/10; F25J 2240/90; F25J 2245/40; F25J 2245/90; F25J 3/08; F25J 3/04387; F25J 2245/50
See application file for complete search history.

(56) References Cited

U.S. PATENT DOCUMENTS

| | | | |
|---|---|---|---|
| 5,914,455 A * | 6/1999 | Jain | B01D 53/0462 95/106 |
| 6,077,488 A | 6/2000 | Jain | |
| 9,810,103 B2 * | 11/2017 | Alekseev | F25J 1/0012 |
| 2005/0150377 A1 | 7/2005 | Friday | |
| 2011/0030332 A1 | 2/2011 | Vandor | |
| 2011/0132032 A1 | 6/2011 | Gatti | |

FOREIGN PATENT DOCUMENTS

| | | | |
|---|---|---|---|
| DE | 1519956 A1 | 4/1969 | |
| EP | 0714689 A | 5/1996 | |
| EP | 0904823 A2 | 3/1999 | |
| EP | 1398585 A1 | 3/2004 | |
| EP | 2835506 A1 | 2/2015 | |
| WO | 2007/096656 A1 | 8/2007 | |
| WO | 2012020234 A2 | 2/2012 | |
| WO | 2013034908 A2 | 3/2013 | |
| WO | WO 2013034908 A2 * | 3/2013 | ................ F02C 1/04 |
| WO | 2014/019698 A2 | 2/2014 | |
| WO | WO 2014019698 A2 * | 2/2014 | ............. F25J 1/0012 |

OTHER PUBLICATIONS

Written Opinion of the International Searching Authority for International Application No. PCT/GB2015/051554 dated Feb. 12, 2016.

* cited by examiner

AIR PURIFICATION UNITS

FIELD OF THE INVENTION

The present invention relates to liquid air energy storage systems, adsorption air purification devices, and methods for their use. In particular, the present invention relates to the integration of air purification devices into liquid air energy storage systems.

BACKGROUND OF THE INVENTION

Air Purification Units (APUs) are used to extract contaminants and undesirable compounds (henceforth "contaminants") from an air stream such that a "purified" air stream is produced for a process. These typically operate using an adsorption process whereby the contaminants, which may be gases, water molecules, hydrocarbon particles or any other undesired species, are adsorbed onto the surface of an adsorbent material. The adsorbent material is carefully selected to preferentially adsorb the contaminants that the process designer wishes to remove. There are two types of adsorption: physical and chemical.

APUs are well known in the art of air liquefaction. They are used to produce a clean, dry stream of air to be liquefied—notably avoiding fouling of the process as contaminants freeze, and ensuring a pure liquid air product. Typically, the APU of an air liquefier is designed to remove carbon dioxide, moisture and hydrocarbons.

An APU typically consists of a vessel containing a particulate bed of adsorbent material through which the process stream flows. Since the adsorbent capacity of an adsorbent material is finite, APUs operate in two principal phases: adsorption and regeneration (otherwise known as desorption). Adsorption is an exothermic process, releasing heat. Desorption requires the addition of heat.

Two of the main process parameters affecting adsorption are pressure and temperature, which may be manipulated to alter the equilibrium between the fluid and the adsorbent. In a physical adsorption process, adsorption increases at higher pressure and decreases at higher temperature. In a chemical adsorption process, the relationship with temperature is often more complex. For simplicity, the following description concentrates on physical adsorption but the principles of the present invention may equally be applied to chemical adsorption processes. Equally, the following description concentrates on the use of APUs for air liquefaction; however, a person skilled in the art will recognise that the principles of the present invention apply to any similar application.

During the adsorption process cycle, pressure and temperature are controlled such that the adsorbent material adsorbs during the adsorption phase and desorbs during the regeneration phase. In what is known in the art as a Pressure Swing Adsorption process, pressure is controlled so that it is high during the adsorption phase and low during the regeneration phase. In what is known in the art as a Temperature Swing Adsorption process, temperature is controlled so that it is low during adsorption and high during regeneration.

In a combined cycle, during the adsorption phase, the pressure of the process air stream is high and the temperature is low so that contaminants are adsorbed onto the surface of the adsorbent material. During the regeneration phase, a lower-pressure, higher temperature regeneration gas stream (which may be air or otherwise) is flowed through the bed. As a result, the equilibrium between the gas stream and the adsorbent material is changed such that contaminants are desorbed from the adsorbent material into the gas stream. The regeneration gas stream is then typically exhausted to atmosphere in order to remove the contaminants from the system. The regeneration phase is usually followed by a cooling phase where the adsorbent bed is cooled, using a cooler stream of gas, to a lower temperature before recommencing the adsorption phase. The lower the temperature of the bed, the more efficient the adsorption.

Since the adsorption and regeneration phases are both necessary, in order to achieve a continuous flow of purified air to the process, APUs in air separation plants predominantly consist of two vessels, of which one adsorbs while the other is regenerated and then cooled. Once the effective capacity of the adsorbing vessel is reached (saturation), the flow paths are swapped using a system of valves so that the regenerated vessel becomes the adsorbing vessel and the "full" vessel begins regeneration.

The phenomenon of adsorption exhibits a number of characteristics which the designer must account for when designing an adsorption system.

As an adsorbent bed adsorbs contaminants from the process stream, a concentration front moves through the vessel. Upstream of this front, the adsorbent material is saturated with contaminant and downstream of this front the adsorbent material is "fresh". In reality, this front is not a discontinuity but a concentration gradient between saturated adsorbent upstream and fresh adsorbent downstream. The zone occupied by this gradient is often referred to as the "mass transfer zone" as this is where mass is transferred from the fluid to the adsorbent during adsorption and from the adsorbent to the fluid during regeneration.

The mass transfer zone will traverse the length of the adsorbent bed at a velocity often referred to as the wave velocity. This determines the time required for the mass transfer zone to traverse the adsorbent bed, and therefore the amount of time to complete the adsorption phase or the regeneration phase.

The length and velocity of the mass transfer zone depends on a number of process parameters, including, for example, the adsorbent used, the size of the adsorbent particles and the velocity of the flow. The shape and velocity of the mass transfer zone generally differ between the adsorption and regeneration phases. Moreover, the shape and velocity of the mass transfer zone may change with time during the cycle.

During the adsorption process, the flow through the adsorption vessel must be stopped before an unacceptable concentration of contaminants arrives at the outflow, when the leading edge of the mass transfer zone arrives at the end of the vessel. In the region of the mass transfer zone, the adsorbent is not fully saturated and the full capacity of the bed has not been used. While the process designer may be able to control the shape and speed of the mass transfer zone to a certain extent, the mass transfer zone will inevitably occupy a portion of the length of the vessel. The shorter the vessel, the larger the relative portion occupied by the mass transfer zone. It is therefore desirable to design the adsorption vessel with sufficient length such that the area occupied by the mass transfer zone is proportionally small and a minimum of adsorbent remains unsaturated at the end of the adsorption phase.

This problem is not generally encountered during the regeneration phase since the regeneration stream is exhausted to atmosphere and one is not concerned with the concentration of contaminants.

A technique for improving the utilisation of the adsorbent bed, which is known in the art of adsorption processes (as described, for example, in Wankat, Phillip C. (1986). Large- Scale Adsorption and Chromatography, Volumes 1-2) but is not disclosed for use in any particular application other than waste water treatment, consists of two columns in series whereby the mass transfer zone may be entirely "pushed" out of one column and into the other so as to fully utilise the bed from the first column. An exemplary implementation of this system in the art comprises three identical columns, of which one regenerates while the remaining two adsorb. The two adsorbing columns are arranged in series in the flow such that the mass transfer zone may overrun from the first column into the second, allowing the first column to be fully saturated. During this time the third column is regenerated. Once the first column is saturated, the third regenerated column is connected in series with the second to capture the mass transfer zone as it exits the second column. Meanwhile the first column is regenerated. By continuing these steps in a cyclical fashion, continuous adsorption may be performed while utilising the full capacity of the adsorbent beds; the mass transfer zone is effectively consistently "pushed" into the newly regenerated vessel. FIG. 1 illustrates the two phases described above.

Another key consideration for the designer of a system is pressure drop—a higher pressure drop equates to more wasted energy. The flow of air through a particulate bed of adsorbent experiences a pressure drop that is primarily a function of the size of the adsorbent particles, the length of the bed and the superficial flow velocity.

Larger particles result in a lower pressure drop but less effective adsorption. Pressure drop may also be reduced by limiting the length of bed or reducing the velocity of the flow through it.

While the velocity of the flow is important for pressure drop, it is most important to maintain low velocity in order to remain below the fluidisation velocity of the adsorbent particles. The fluidisation velocity is the velocity at which the adsorbent particles begin to move due to the forces exerted on them by the moving fluid. This can cause layers of different adsorbent types to mix and may result in contamination of the wider process with adsorbent leaving the APU.

In order to maintain low velocity, it is well understood in the art that for a vessel of length L and diameter d containing a given quantity of adsorbent, velocity may be reduced by selecting a smaller length to diameter ratio (L/d). This has the effect of increasing the cross-sectional flow area, resulting in lower flow velocity. Furthermore, the shorter vessel length will contribute to a lower pressure drop.

However, cost considerations lead the designer to limit the diameter of the vessel. Furthermore, if the vessel diameter is too great, the flow may not be well distributed within it and dead zones may exist around the circumference at the extremities where little or no mass transfer occurs between the fluid and the adsorbent.

There is also a motivation to maintain sufficient length in the vessel so that the mass transfer zone does not occupy a large proportion of the length of the adsorbent bed.

While it is desirable for the above reasons to limit flow velocity, it is preferable to keep the flow velocity high enough so that axial dispersion is not a dominant mass transfer mechanism, as axial dispersion tends to reduce the efficiency of the adsorption process by elongating the mass transfer zone.

It is therefore known in the art that there is a trade-off in the design of the APU with regard to the different requirements of the process and the cost of building the system.

A further consideration in the design of an APU is the source of the regeneration stream. In state-of-the-art air liquefiers, the regeneration gas stream is primarily sourced from the clean input air stream, a portion of which is diverted, expanded to a lower pressure, heated and used to regenerate the regenerating vessel.

FIG. 2 shows a simplified example of a state-of-the-art regeneration scheme, wherein a stream of feed air from ambient is drawn into compressor 100 where it is compressed. The air stream flows through adsorption vessel 111 where contaminants are removed by adsorption. Now consisting of clean, dry air, the air stream is split into a process air stream and a regeneration air stream. The process air stream is supplied to a cold box 120 which forms part of an air liquefier. The regeneration air stream is let down to lower pressure in valve 201 and flows through heating device 101 where heat is added to raise the temperature to the required regeneration temperature. The required regeneration temperature at the outflow of heating device 101 depends notably on the adsorbent material(s) used and the desired concentration to be achieved. The warmed regeneration air stream is then flowed through the regeneration vessel 112, where contaminants are desorbed into the regeneration air stream and evacuated with it to atmosphere. Once regeneration vessel 112 is regenerated, heating device 101 is turned off and the now cooler regeneration stream is used to cool the adsorbent in regeneration vessel 112. The regeneration and cooling nominally last the same time as the adsorption process.

However, it will be appreciated that the above method requires the feed air compressor 100 to be over-sized in order to provide the extra flow rate required for regeneration, which is ultimately wasted to atmosphere and not liquefied.

Alternatively, where another gas stream is available, this may be used to regenerate the APU. EP2510294 describes an air separation plant wherein air is liquefied in an air liquefier and separated into its component parts in a cryogenic distillation column. A portion of the resulting pure nitrogen is used to regenerate the APU before being vented to atmosphere while the oxygen component is a final product stream. This method is used only where there is not sufficient demand for the nitrogen product.

In state of the art APUs, the flow of the regeneration stream is continuously available as long as there is a process stream to be purified. In such cases, the APUs, and the systems in which they are used, operate well. However, several problems have been met when using APUs in cryogenic energy storage systems such as liquid air energy storage (LAES) systems. Such systems are known to provide an effective means of storing energy on a large scale to balance consumer demand for electricity with electricity generating capacity, and to smooth out levels of intermittent supply from, for example, renewable energy sources.

WO2007/096656 and WO2013/034908 disclose cryogenic energy storage systems which exploit the temperature and phase differential between low temperature liquid air and ambient air, or waste heat, to store energy at periods of low demand and/or excess production, allowing this stored energy to be released later to generate electricity during periods of high demand and/or constrained output. The systems comprise a means for liquefying air during periods of low electricity demand, a means for storing the liquid air produced, and a series of expansion turbines (or a series of stages of an expansion turbine) for expanding the liquid air. The expansion turbine(s) are connected to a generator to generate electricity when required to meet shortfalls between supply and demand.

An advantage of LAES over other energy storage technologies is that the liquefaction of air may be decoupled from power recovery such that the rates of charge and discharge, and the quantity of energy stored as liquid air are all independent (i.e. the respective stages of operation take place separately; that is singly and usually consecutively, rather than concomitantly). The differing charge and discharge rates are referred to as asymmetric operation and allow, for example, slow charging overnight and rapid discharge of the stored energy over only a few hours of peak electricity demand during in the day. This is known as 'asymmetric operation' and charge times may be several times longer than discharge times.

In a conventional air liquefaction plant, a stream of clean, dry air is required for liquefaction, and an APU must be employed.

In a state-of-the-art LAES system, during the charging phase when air is being liquefied, a regeneration scheme typical of traditional air liquefaction plants is used, as shown in FIG. 2. In such a system, a portion of the process air is diverted via a heating device to the regeneration vessel and then vented to ambient to remove the contaminants from the system. Thus, it is necessary to sacrifice a portion of the input air as no waste gas streams are generally available for regeneration, and this is undesirable.

One of the key parameters of a commercially viable energy storage system is the round-trip efficiency, which represents the portion of the energy input to the system that is recovered following storage. It is desirable to minimise the energy required to produce liquid air in the liquefier and maximise the energy extracted from the air in the power recovery unit.

In order to optimise the round-trip efficiency of LAES systems, there is a need to reduce the power required for the regeneration of the APU, and thus avoid sacrificing a portion of the input air.

Furthermore, there is a need to better adapt an APU to operate efficiently within the constraints imposed by the asymmetric operation of LAES (i.e. without the two-phase continuous adsorption cycles described above, wherein the regeneration stream is available for the same duration as the adsorption phase).

SUMMARY OF THE INVENTION

The present inventors have realised that the energy required for the regeneration of the APU may be reduced by utilising the clean, dry air available at the exhaust of the power recovery unit during the LAES discharge phase to regenerate the adsorbent material in the APU.

Accordingly, in a first aspect, the present invention provides a liquid air energy storage system, comprising:
an air liquefier comprising:
  an air input having compression means configured to compress input air and cooling means configured to cool the input air;
  an adsorption air purification unit coupled to the air input and configured to purify the compressed and cooled input air from the air input; and
  a cold box coupled to the adsorption air purification unit and configured to liquefy the purified air from the adsorption air purification unit;
a liquid air storage facility for storing the liquefied air from the air liquefier;
a power recovery unit coupled to the liquid air storage facility comprising:
  a pump configured to pressurize the liquefied air from the liquid air storage facility into a high-pressure liquefied air;
  an evaporator configured to transform the high-pressure liquefied air from the pump into high-pressure gaseous air;
  an expansion turbine coupled to the evaporator and capable of being driven by the high-pressure gaseous air from the evaporator;
  a generator coupled to the expansion turbine and configured to generate electricity from the expansion turbine; and
  an exhaust coupled to the expansion turbine for exhausting low-pressure gaseous air from the expansion turbine to an air output; characterised in that:
the exhaust is coupled to the adsorption air purification unit such that at least a portion of the low-pressure gaseous air exhausted from the expansion turbine is usable to regenerate the adsorption air purification unit.

By utilising the low-pressure gaseous air exhausted from the expansion turbine to regenerate the adsorption air purification unit, the round-trip efficiency of LAES systems is improved compared with systems that sacrifice a portion of the input air or use an alternative supply.

The liquid air energy storage system preferably comprises valve means coupled to the adsorption air purification unit and configured to switch between a first state in which it enables the adsorption air purification unit to receive air from the air input and the cold box to receive purified air from the adsorption air purification unit; and a second state in which it enables the adsorption air purification unit to receive low-pressure gaseous air exhausted from the expansion turbine and the adsorption air purification unit to pass the low-pressure gaseous air to the air output.

Thus, the APU of the LAES system is operable either to purify the input air (i.e. during the charging phase of the LAES) or to regenerate (i.e. during the discharging phase of the LAES) and is switchable between these states.

Preferably, the system is operable in each of:
a charging phase, wherein air is received at the air input, purified in the air purification unit, liquefied in the air liquefier and passed to the liquid air storage facility;
a storage phase, wherein liquid air is stored in the liquid air storage facility; and
a discharging phase, wherein liquefied air is passed from the liquid air storage facility to the power recovery unit, transformed into high pressure gaseous air, used to drive the expansion turbine, and exhausted through the exhaust.

In that case, the valve means is in its first state whilst the system is in its charging phase and is in its second state whilst the system is in its discharging phase.

Preferably, the system is operable in each of the charging phase, storage phase and discharging phase singly and consecutively. In other words, the respective stages of operation take place separately; that is singly and usually consecutively (although this need not necessarily be the case), rather than concomitantly, as with continuous systems.

Preferably, the system comprises a heating device between the adsorption air purification unit and the exhaust to heat the exhaust stream used for regenerating the APU.

The heating device may be either an electrical heater or a heat exchanger coupled to a source of heat, preferably waste heat. For instance, the heating device may be a heat exchanger which exchanges heat with another part of the LAES system, or with a co-located process such as a co-located process that generates waste heat. Using a source of waste heat instead of an electric heater has the advantage that the energy cost of regenerating the APU may be reduced.

In some embodiments, the system comprises a thermal store configured to receive heat from the compression means of the air input and/or the cold box of the air liquefier during the charging phase. This enables the heat generated in those components to be stored and used elsewhere in the system rather than wasted, further improving the efficiency.

For instance, the thermal store may be configured to transfer heat to the evaporator or to inter-stage reheat heat exchangers in the power recovery unit, and/or to the aforementioned heating device, during the discharging phase.

In some embodiments, the system comprises a cold store configured to transfer cold energy to the cold box of the liquefier during the charging phase. This enables the cold generated in the power recovery components to be stored and used elsewhere in the system rather than wasted, further improving the efficiency.

For instance, the cold store may be configured to receive cold energy from the evaporator of the power recovery unit during the discharging phase.

It will be appreciated that the use of the terms 'cold', 'cold energy' and 'cold store' are analogous to 'heat', 'thermal energy' and 'thermal store' except for temperatures below ambient. This terminology is conventional in cryogenic arts, and is well understood by a skilled person.

In one embodiment, the exhaust is configured to pass a first portion of the low-pressure gaseous air to the adsorption air purification unit and pass the remaining low-pressure gaseous air to the air output. Thus, the amount of low-pressure gaseous air diverted through the APU may be controlled, and the remainder may be bypassed. This enables the back-pressure experienced at the turbines to be limited to only what is necessary for regenerating the APU while also ensuring that the flow velocities within the APU are acceptable; in particular, below the fluidisation velocity.

The air output may be vented to atmosphere. Alternatively, the air output may be coupled to the cold store via the evaporator such that the low-pressure gaseous air exhausted from the expansion turbine is cooled and then transfers cold to the cold store, so that it may be later used to further improve efficiency.

Methods of operating a liquid air energy storage system corresponding to the systems mentioned above are also provided and claimed, and have corresponding advantages.

It will be appreciated that with the asymmetric operation of an LAES, the exhaust stream from the power recovery turbine often lasts for considerably shorter periods than the flow of input air purified by the APU. There is therefore also a need to provide for faster regeneration of the adsorbent bed without exceeding fluidisation velocity and while minimising the pressure drop across the APU.

Accordingly, in a second aspect, the present invention provides an adsorption air purification device for use in a liquid air energy storage system, the device comprising:
first and second fluid openings;
at least two adsorbent vessels connected between the first and second fluid openings;
an arrangement of conduits and valves configured to direct a first stream of air to pass through a combination of one or more of the adsorbent vessels to remove contaminants from the first stream of air, and to direct a second stream of air to pass through the combination of one or more of the adsorbent vessels to regenerate the adsorbent vessels; and
a controller configured to open and close said valves;
wherein the arrangement of conduits and valves is such that the controller may open and close said valves so as to selectively direct:
a) the first stream of air to pass between the first and second fluid openings through at least a first adsorbent vessel in series; and
b) the second stream of air to pass between the first and second fluid openings through at least the first and a second adsorbent vessel in parallel.

By passing one stream through one or more of the vessels in series whilst passing another stream through that vessel (with another) or those vessels in parallel, the time taken for regeneration of the vessels may be reduced whilst maintaining optimum flow characteristics and without exceeding fluidisation velocity. In other words, the APU is more flexible, and can be tailored to accommodate the constraints of a liquid air energy storage system in ways not achievable by systems of the prior art.

Preferably, the arrangement of conduits and valves is such that the controller may open and close said valves so as to selectively direct:
a) the first stream of air to pass between the first and second fluid openings through two or more of the adsorbent vessels in series; and
b) the second stream of air to pass between the first and second fluid openings through the said two or more of the adsorbent vessels in parallel.

The APU may comprise at least two adsorbent vessels; or at least three adsorbent vessels; or at least four adsorbent vessels; or at least six adsorbent vessels; or at least eight adsorbent vessels; or at least twelve adsorbent vessels. Irrespective of the number of vessels, the controller may still be configured to open and close said valves so as to selectively direct the first stream of air to pass through at least a first adsorbent vessel in series; and through at least the first and a second adsorbent vessel in parallel.

The arrangement of conduits and valves may be such that the controller may open and close the valves so as to direct the first stream of air to pass through two or more of the adsorbent vessels in series, or three or more of the adsorbent vessels in series, or four or more of the adsorbent vessels in series, or six or more of the adsorbent vessels in series, or all of the adsorbent vessels in series. Again, irrespective of the number of vessels through which the first stream passes in series, the APU may comprise any number of adsorbent vessels (providing, of course, it is as least as many as the number through which the second stream passes in parallel); and the controller may still be configured to open and close said valves so as to selectively direct the second stream of air to pass through two or more of the adsorbent vessels in parallel.

In various of the above described arrangements, the arrangement of conduits and valves may be such that the controller may open and close said valves so as to direct the second stream of air to pass through the said three or more of the adsorbent vessels in parallel, or the said four or more of the adsorbent vessels in parallel, or the said six or more of the adsorbent vessels in parallel, or all of the adsorbent vessels in parallel. Again, irrespective of the number of vessels through which the second stream passes in parallel, the APU may comprise any number of adsorbent vessels (providing it is at least two and, of course, as least as many as the number through which the first stream passes in series); and the controller may still be configured to open and close said valves so as to selectively direct the first stream of air to pass through one or more of the adsorbent vessels in series.

Preferably, the arrangement of conduits and valves is such that the controller may open and close said valves so as to direct the first stream of air to pass between the first and second fluid openings through only a first subset of the at least two adsorbent vessels in series; and subsequently through only a second subset of the at least two adsorbent vessels in series, wherein the first and second subsets have at least one adsorbent vessel in common. By 'a subset', it is meant at least one vessel but not all vessels. For instance, if the APU has five vessels, a subset could be any one, two, three or four vessels. In some embodiments, each of the first and second subsets are subsets of at least two vessels. By utilising only a subset of the vessels at a time the length is reduced, thereby minimising the pressure drop compared with utilising all vessels. Nevertheless, by cycling through all of the vessels split into two or more subsets, the total volume of adsorbent required can be kept to a minimum by reducing the length of unused bed.

For instance, in one embodiment, the at least two adsorbent vessels connected between the first and second fluid openings includes first, second and third adsorbent vessels, and wherein the arrangement of conduits and valves is such that the controller may open and close said valves so as to direct the first stream of air to pass:
a) between the first and second fluid openings through only the first and second adsorbent vessels in series; and subsequently
b) between the first and second fluid openings through only the second and third adsorbent vessels in series.

In another embodiment, the at least two adsorbent vessels connected between the first and second fluid openings includes a fourth adsorbent vessel, and wherein the arrangement of conduits and valves is such that the controller may, subsequent to step (b), open and close said valves so as to direct the first stream of air to pass between the first and second fluid openings through only the third and fourth adsorbent vessels in series.

It will be appreciated that any number of vessels could be connected between the first and second fluid openings, and utilised in the cycle in the same manner.

In one exemplary embodiment, the at least two adsorbent vessels connected between the first and second fluid openings includes first and second adsorbent vessels, wherein the arrangement of conduits and valves is such that the controller may open and close said valves so as to direct the first stream of air to pass:
a) between the first and second fluid openings through only the first adsorbent vessel; and subsequently
b) between the first and second fluid openings through only the second adsorbent vessel.

In an alternative exemplary embodiment, the at least two adsorbent vessels connected between the first and second fluid openings includes first, second and third adsorbent vessels, wherein the arrangement of conduits and valves is such that the controller may open and close said valves so as to direct the first stream of air to pass:
a) between the first and second fluid openings through only the first adsorbent vessel; and subsequently
b) between the first and second fluid openings through only the second adsorbent vessel; and subsequently
c) between the first and second fluid openings through only the third adsorbent vessel.

The advantage of this configuration is that it is simpler, requiring fewer valves and less pipework, whilst still providing many of the advantages described above.

Preferably, the arrangement of conduits and valves is such that the controller may open and close said valves so as to direct the second stream of air to pass between the first and second fluid openings through only a first subset of the at least two adsorbent vessels in parallel; and subsequently through only a second subset of the at least two adsorbent vessels in parallel. Again, by 'a subset', it is meant at least one vessel but not all vessels. For instance, if the APU has six vessels, a subset could be any one, two, three, four or five vessels. By utilising only a subset of the vessels the flow rate of the portion of the exhaust used to regenerate may be minimised while achieving the same velocity within the vessels. Nevertheless, by cycling through all of the vessels split into two or more subsets, the total volume of adsorbent can be maximised. In some embodiments, each of the first and second subsets are subsets of at least two vessels.

Preferably, the first and second subsets mentioned in the preceding paragraph have no adsorbent vessels in common. In the case where there are six vessels, for example, the first and second subsets could be four and two vessels, or three and three vessels, or three subsets of two vessels respectively.

The present invention also provides a liquid air energy storage system, comprising:
an air liquefier comprising an air input having compression means and cooling means, an adsorption air purification device as set out above, and a cold box;
a liquid air storage facility; and
a power recovery unit comprising a pump, an evaporator, an expansion turbine, a generator and an exhaust;
wherein the system is selectively operable in each of:
a charging phase, wherein air is received at the air input, purified in the air purification unit, liquefied in the air liquefier and passed to the liquid air storage facility;
a storage phase, wherein liquid air is stored in the liquid air storage facility; and
a discharging phase, wherein liquefied air is passed from the liquid air storage facility to the power recovery unit, transformed into high pressure gaseous air, used to drive the expansion turbine, and exhausted through the exhaust;
wherein the arrangement of conduits and valves in the adsorption air purification device is arranged such that the first stream of air is provided by the air received at the air input and the second stream of air is provided by at least a portion of the air exhausted through the exhaust; and
wherein the controller is configured to open and close said valves so as to selectively direct:
a) the air received at the air input to pass between the first and second fluid openings through at least a first adsorbent vessel in series, during the charging phase; and
b) the at least a portion of the air exhausted through the exhaust to pass between the first and second openings through at least the first and a second adsorbent vessel in parallel during the discharging phase.

Preferably, the controller is configured to open and close said valves so as to selectively direct:
a) the air received at the air input to pass between the first and second fluid openings through two or more of the adsorbent vessels in series, during the charging phase; and
b) the at least a portion of the air exhausted through the exhaust to pass between the first and second openings through the said two or more of the adsorbent vessels in parallel during the discharging phase.

LAES systems may operate for different durations at different times; for example, according to the time of the week, month or year. It will be recognised that valves and pipework may be provided such that the configuration of the APU may be altered within the same system, in accordance with the principles laid out hereinabove. For example, in a weekly cycle where the charge phases are shorter on weekdays compared to weekends and conversely discharging phases are longer on weekdays than weekends, the APU may comprise multiple vessels, of which all are saturated by the end of the weekend and which are progressively regenerated over the course of the week days.

Whilst the optional arrangements and methods mentioned above pertaining to adsorption and desorption of the APU have been set out in the context of a liquid air energy storage system, they are novel arrangements and methods in their own right. Accordingly, protection may be sought for one or more of the novel arrangements and methods for adsorption (i.e. passing a fluid through two or more adsorbent vessels in series) and/or one or more of the novel arrangements and methods for desorption (i.e. passing a fluid through two or more adsorbent vessels in parallel). Whilst the APUs described herein have a particular benefit in LAES systems, nothing about such LAES systems is essential to the principles of operation of the APUs described herein.

For instance, the present invention also provides an adsorption air purification device comprising:
first and second fluid openings;
at least four adsorbent vessels connected between the first and second fluid openings;
an arrangement of conduits and valves; and
a controller configured to open and close said valves;
wherein the arrangement of conduits and valves is such that the controller may open and close said valves so as to direct the stream of air to pass between the first and second fluid openings through only a subset of the at least four adsorbent vessels in series.

A corresponding method is also provided.

The present invention also provides an adsorption air purification device comprising:
first and second fluid openings;
at least four adsorbent vessels connected between the first and second fluid openings;
an arrangement of conduits and valves; and
a controller configured to open and close said valves;
wherein the arrangement of conduits and valves is such that the controller may open and close said valves so as to direct the stream of air to pass between the first and second fluid openings through only a subset of the at least four adsorbent vessels in parallel.

A corresponding method is also provided.

In the present description, the term 'vessel' is used to mean a single pressure vessel that provides a volume for containing a certain amount of adsorbent, wherein that volume has an input and an output which can be switched into or out of communication with the remainder of the system. As will be appreciated, the volume of any given vessel need not be provided as a single container or reservoir and may instead be provide by a vessel made up of two or more interconnected containers or reservoirs that behave to all intents and purposes as a single larger vessel and share a common input and output for communicating with the rest of the system. In a vessel that is made up of two or more interconnected containers or reservoirs, it will be observed that if there is flow through one of the containers or reservoirs, there is flow through the other(s).

BRIEF DESCRIPTION OF THE FIGURES

Preferred embodiments of the invention will now be described with reference to the accompanying drawings, in which.

DETAILED DESCRIPTION

The pressures, temperatures and flow rate used in the following description are intended to illustrate the invention. A person skilled in the art will recognise that a wide range of possible values exist depending on the design of the adsorption process.

Figure 1:
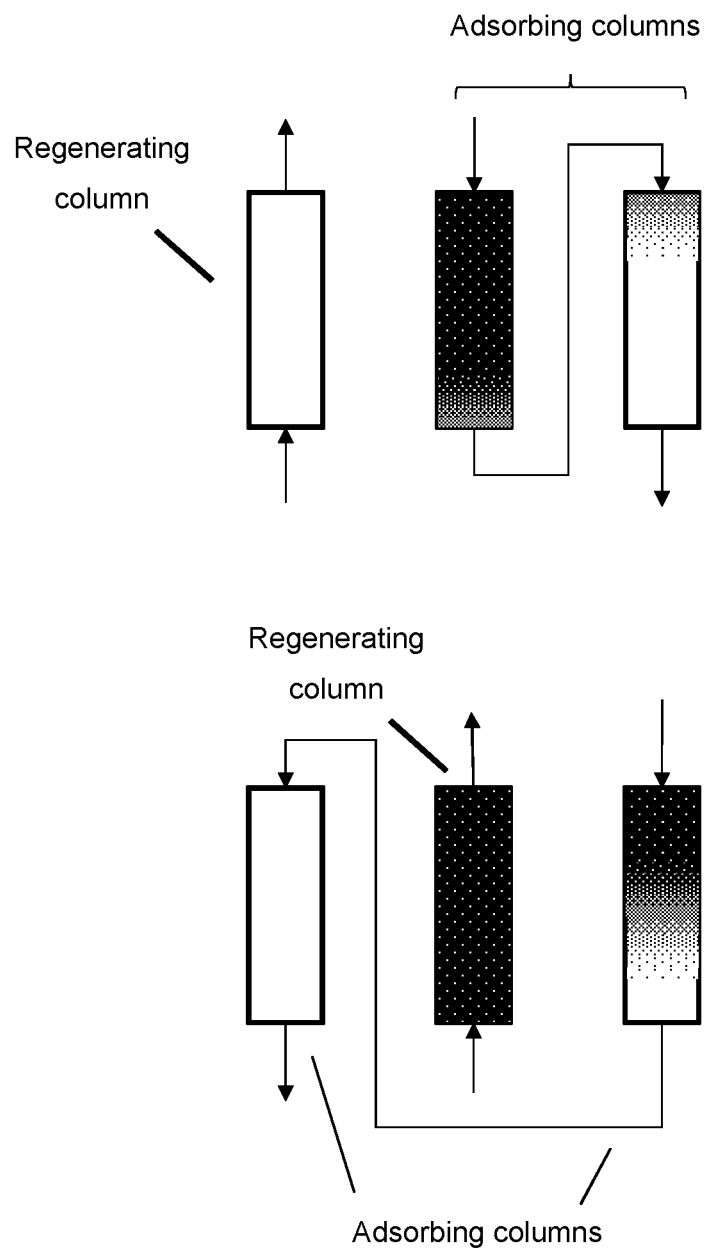
FIG. 1 is a schematic of a state of the art APU.
Figure 2:
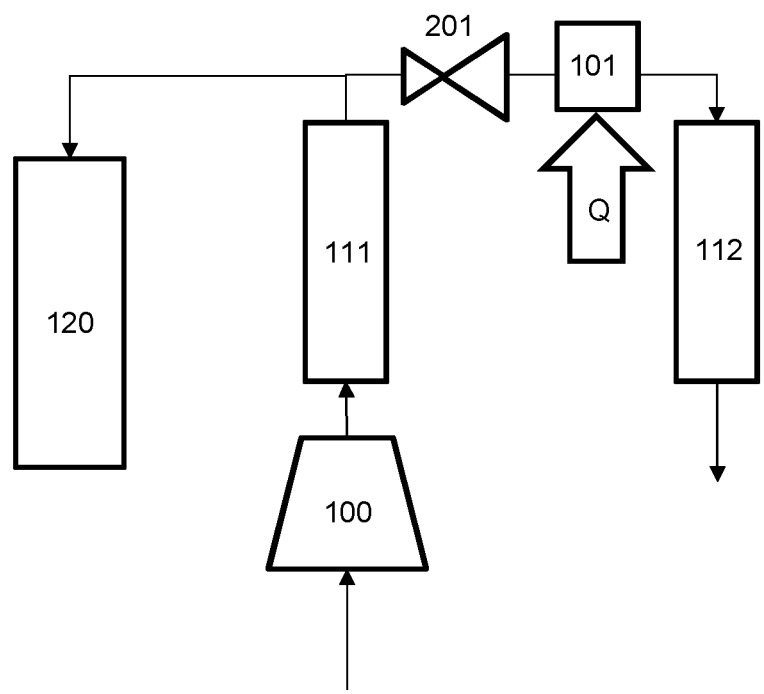
FIG. 2 is a schematic of a state-of-the-art regeneration scheme in an exemplary liquefier.
Figure 3:
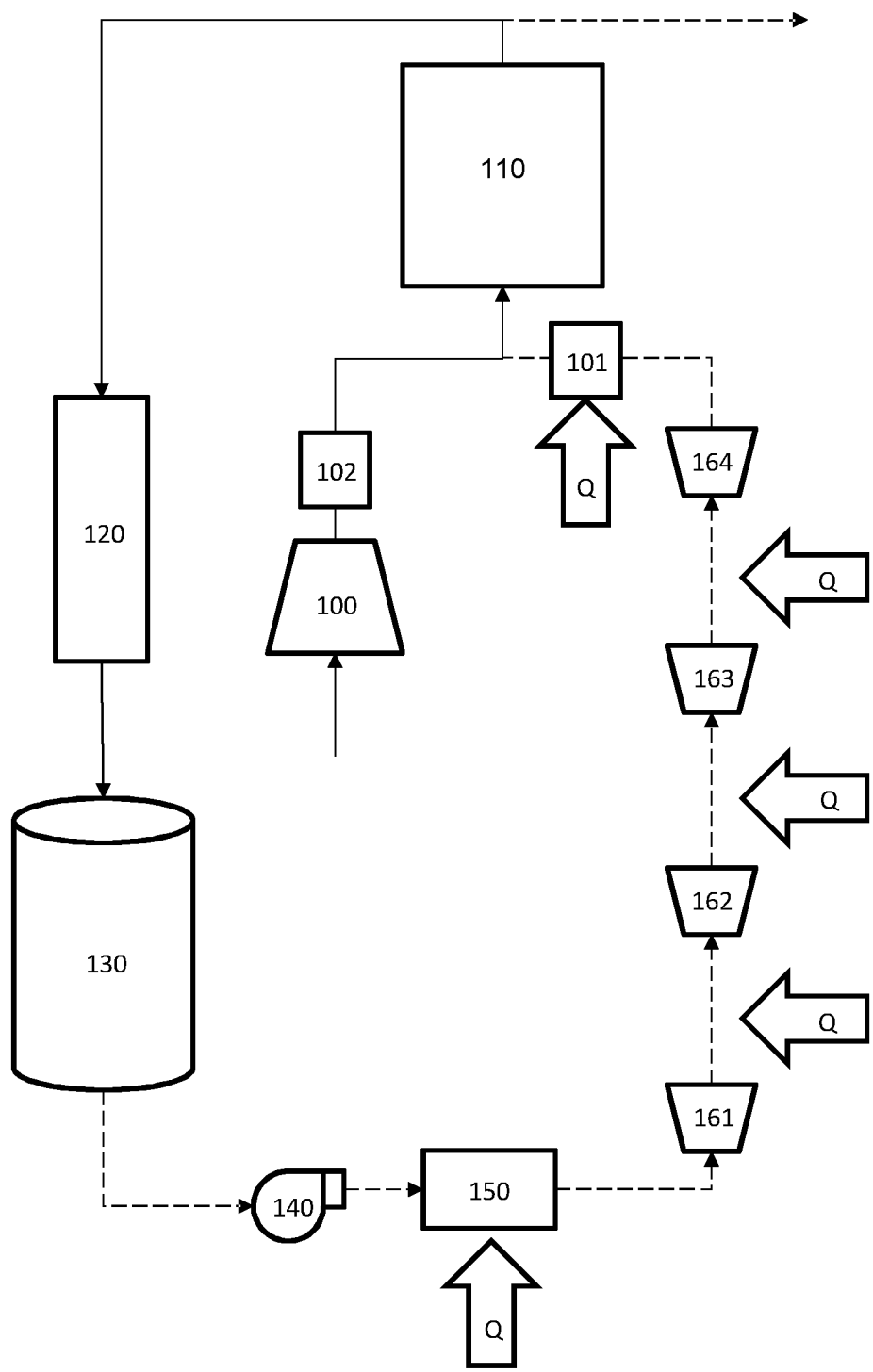
FIG. 3 is a schematic of a first embodiment of a liquid air energy storage system according to the first aspect of the invention.

A first embodiment of the first aspect of the invention is shown in FIG. 3. According to this embodiment, during the charging phase the APU is fluidly connected to the air liquefier such that contaminants are removed from the input air stream prior to the gas-liquid phase change. During the discharging phase, the APU is fluidly connected to the power recovery unit such that the clean, dry air exhausted from the expansion means flows through the adsorption vessels and desorbs the contaminants (i.e. regenerates the adsorbent material) before being vented to ambient, evacuating the contaminants from the system. Cooling of the bed may be achieved passively or actively between charge and discharge phases or actively as part of the discharge phase.

As shown in FIG. 3, the LAES system comprises a compressor 100, a cold box 120, a cryogenic store 130, a cryogenic pump 140, an evaporator 150, expansion turbines 161 to 164 (although any number of turbines may optionally be provided), a heating device 101, and an APU 110.

Together, the compressor 100, APU 110 and cold box 120 are elements of an air liquefier, as understood by a skilled person. During the charging phase, the APU 110 is situated in the liquefaction stream (shown by the continuous line), downstream of the compressor 100 and upstream of the cold box 120. During the discharging phase, the APU is situated in the power recovery stream (shown by the dashed line), downstream of the heating device 101 and upstream of the ambient outflow. Q represents the addition of heat.

Heating device 101 may comprise an electrical heater or alternatively a heat exchanger for exchanging waste heat from a heat source such as a co-located process (for instance, a power plant), or from within the LAES process (for instance, the heat of compression). The addition of cold and/or heat energy from a co-located process is described in WO2012020234.

The embodiment shown in FIG. 3 may additionally comprise a thermal store (not shown). During the charging phase, the thermal store may recover heat from any of the compressors including compressor 100 and the compression devices located in the cold box arrangement 120 of the air liquefier. The recovered heat may be stored in the thermal store. During the discharging phase, heat stored in the thermal store may be recycled to reheat the air stream between expansion stages 161 to 164 and/or the heating device 101 during the discharge phase.

The embodiment shown in FIG. 3 may additionally comprise a cold store (not shown). During the discharge phase, the cold store may recover cold from the evaporator 150. The recovered cold may be stored in the cold store. During the charging, cold stored in the cold store may be recycled to provide cooling to the cold box arrangement 120 of the air liquefier.

Figure 4:
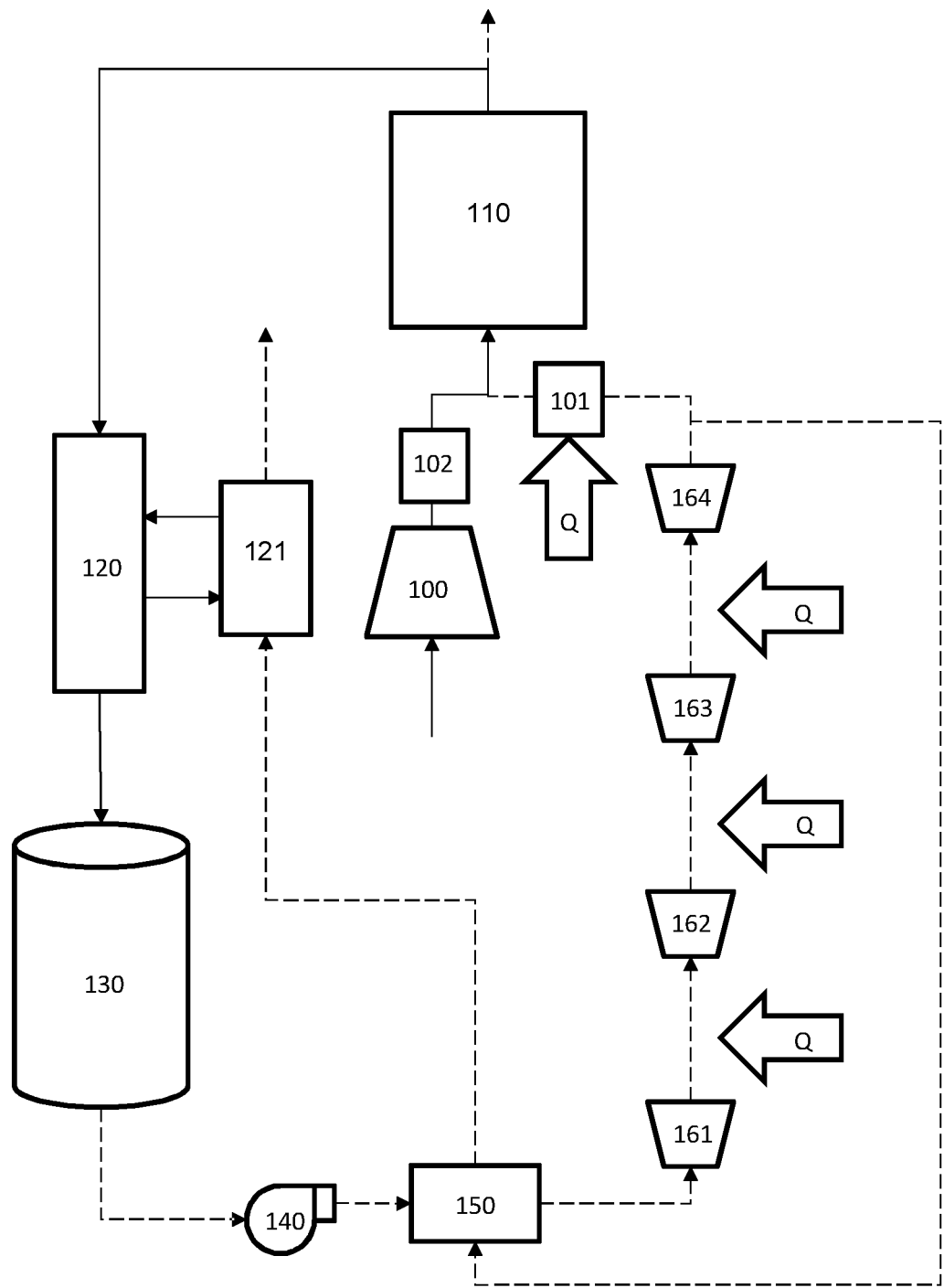
FIG. 4 is a schematic of a second embodiment of a liquid air energy storage system according to the first aspect of the invention.

A second embodiment of the first aspect of the invention is shown in FIG. 4. The second embodiment is identical to the first, except for the following. In the embodiment of FIG. 4, a portion of the exhaust from the expansion device 164 may be diverted through the APU 110 (as described in connection with FIG. 3) while the remainder of the exhaust from the expansion device 164 bypasses the APU 110. Optionally, the exhaust is vented directly to atmosphere, but in accordance with the second embodiment it can be used in the LAES system.

As shown in FIG. 4, the exhaust from the final expansion stage 164 during the discharge phase is split into a first and a second portion. The first portion is heated in heating device 101 and used to regenerate the APU 110 before being exhausted to ambient. The second portion of the exhaust is directed to evaporator 150 where it is cooled by the evaporating air passing from pump 140 to expansion means 161. The second portion of the exhaust stream then flows through cold store 121 where it is warmed before being rejected to atmosphere. Cold store 121 stores the cold recovered from evaporator 150 and later supplies it to the cold box arrangement 120 during the charge phase.

Cooling of the APU may be achieved through passive cooling if there is sufficient time between discharge and charge phases for the adsorbent to return to the required temperature. Alternatively, where there remains liquid air in the cryogenic storage tank, boil-off gas due to heat ingress into said tanks may be used to cool the APU.

Alternatively, the APU may be actively cooled using the exhaust stream from the power recovery stages, simply by turning off (in the case of an electric heater) or bypassing (in the case of a heat exchanger) heating device 101. Where cooler temperatures are required, the regeneration stream may be further cooled using a blast cooler. Alternatively, colder temperatures may be achieved at the exhaust stream by performing the last stage of expansion without reheat, or by recovering low-grade cold from the stream exiting the evaporator 150.

Figure 5:
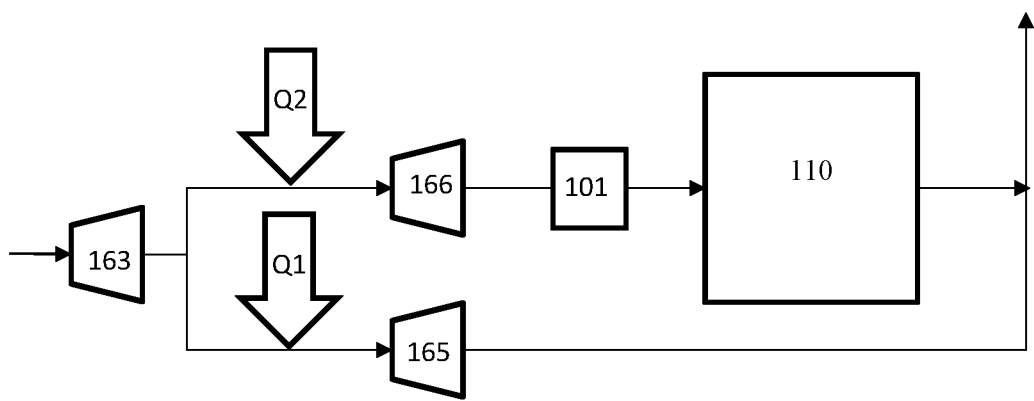
FIG. 5 is a schematic of an alternative arrangement of the expansion stages and the APU of FIG. 4.

FIG. 5 shows an alternative arrangement of the expansion stages and the APU wherein, during the discharge phase, following the penultimate expansion stage 163, the air stream is split into a first and a second portion. At the start of the regeneration phase, both the first and second portions are reheated (Q1 and Q2 respectively) and expanded through expansion devices 165 and 166 respectively. The first portion is exhausted to ambient. The second portion is then further heated in heating device 101 and used to regenerate APU 110. Following regeneration, the reheat Q2 is removed and heating device 101 is turned off or bypassed. The second portion is expanded directly through expansion stage 166 to arrive at a lower temperature. The now lower temperature second portion is used to cool APU 110 to a lower temperature. Using a lower temperature stream, cooling may be also performed faster.

The expansion device 166 through which the second portion of the air stream passes may also have a slightly higher discharge pressure than the expansion device 165 through which the first portion of the air stream passes in order to allow a higher pressure drop across the APU 110 during regeneration. Exemplary discharge pressures for the expansion device 165 through which the first portion of the air stream passes are between 1.1 and 1.3 $bar_{abs}$, preferably 1.2; and exemplary discharge pressures for the expansion device 166 through which the second portion of the air stream passes are between 1.4 and 2.1 $bar_{abs}$. Preferably the discharge pressure of the expansion device 166 through which the second portion of the air stream passes is between 100 and 1000 mbar higher than the discharge pressure of the expansion device 165 through which the first portion of the air stream passes, preferably between 100 and 500 mbar higher.

Indeed, the arrangement in FIG. 5 may even be employed to provide a higher pressure drop across the APU without removing reheat Q2 and/or without turning off or bypassing heating device 101. Preferably, in such an arrangement, a different means for cooling is provided, such as that described in relation to the embodiment shown in FIG. 7 below.

Figure 6:
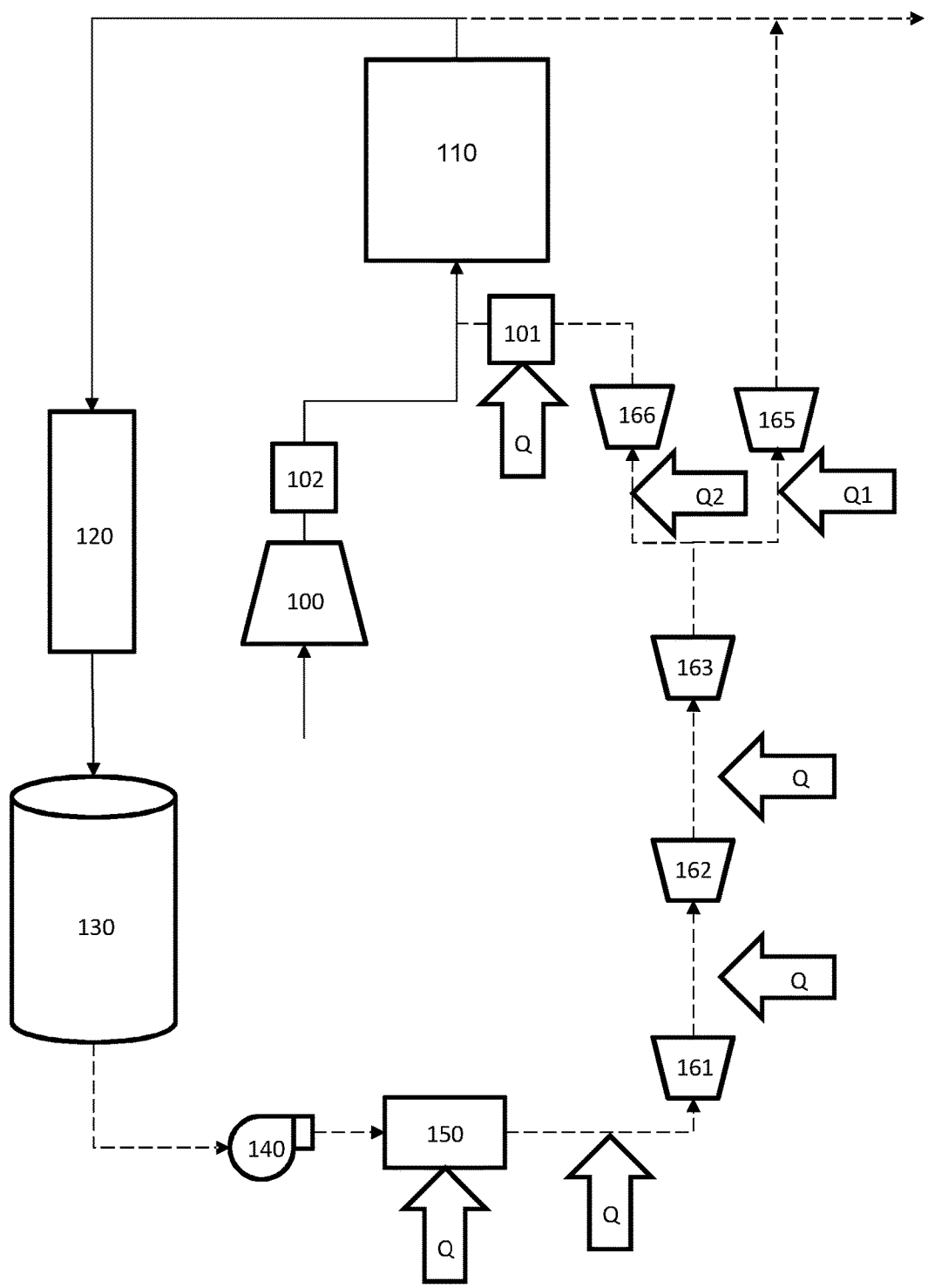
FIG. 6 is a schematic of a third embodiment of a liquid air energy storage system according to the first aspect of the invention.

A first preferred operation of the LAES device will now be described with reference to the third embodiment of the first aspect of the invention, as shown in FIG. 6. The third embodiment is identical to the first embodiment shown in FIG. 3, in combination with the alternative arrangement shown in FIG. 5.

In the present example, for the purposes of illustration liquid air from cryogenic storage device 130 is pumped to 120 bar. A skilled person will recognise that the specific pumping pressure is not essential to the invention but may be selected based on the specific design of any given LAES system. Typical pumping pressure range from 60 to 200 bar and more preferably 100 to 140 bar. Furthermore, the inter-stage reheat temperature is 150 deg C. Equally, the specific reheat temperature is not essential to the invention but may be selected based on the specific design of any given LAES system. The reheat temperature into the final expansion stage has an influence on the temperature of the exhaust stream, which in turn is one of the aspects informing the design choices for the APU according to the present invention; as will be apparent to a skilled person based on the following examples.

The LAES system shown in FIG. 6, operates with a 12-hour charge phase and a 4-hour discharge phase. During the charge phase, air is drawn in from ambient at a flow rate of 10 kg/s, compressed in compression means 100 to 10 bar, cooled to ambient temperature in cooler 102, and purified in APU 110. The resulting clean, dry air is sent to the cold box 120 to be liquefied and stored in cryogenic storage device 130.

During the discharge phase, liquid air from cryogenic storage device 130 is pumped to 120 bar absolute at a flow rate of 30 kg/s, evaporated in evaporator 150 with the addition of heat (Q) to become clean, dry, high-pressure gaseous air at 120 bar and approximately ambient temperature.

This air stream is superheated to around 150° C. and expanded in expansion stage 161 to approximately 40 bar, emerging from expansion stage 161 at approximately 60° C. The air stream is reheated to 150° C. and expanded in expansion stage 162 to approximately 10 bar, emerging from expansion stage 162 at approximately 45° C. The air stream is again reheated to 150° C. and then expanded in expansion stage 163 to approximately 5 bar, emerging from expansion stage 163 at approximately 95° C. The air stream is then split into a first and a second portion.

The first portion is reheated to 150° C. (Q1) and then expanded in expansion stage 165 to approximately 1.2 bar, emerging from expansion stage 165 at approximately 45° C., and then exhausted to ambient.

At the start of the discharge phase, the second portion is reheated to 150° C. (Q2) and then expanded in expansion stage 166 to approximately 1.2 bar, emerging from expansion stage 166 at approximately 45° C. It is then further heated in heating device 101 to approximately 200° C. and flowed through APU 110 to regenerate the adsorbent material of said APU.

Once APU 110 has been regenerated, heat source Q2 is removed and heating device 101 is turned off or bypassed. The first portion enters expansion device 166 at approximately 5 bar and 95° C. and is expanded to around 1.2 bar, emerging from expansion device 166 at approximately 1° C. The now cooler second portion flows through the APU and cools the adsorbent bed.

It will be understood that in a commercial LAES, the charging phase may last for many hours and require a large volume of air to be purified. A sufficient volume of adsorbent material is required to purify the entire quantity of air to be liquefied, as no regeneration occurs during this phase.

Thus, for a liquefaction process running for many hours, a large bed of adsorbent is required and a larger pressure drop may be expected across the adsorbent bed during both adsorption and regeneration.

Furthermore, it will be understood that the charge and discharge phases of LAES are asymmetric; for example, the charging phase may last several times as long as the discharge phase or longer. Therefore flexibility is required in the APU to enable shorter regeneration times (to cope with the comparatively short discharge phase) while minimising pressure drop and maintaining the correct flow conditions for adsorption and regeneration.

Figure 7:
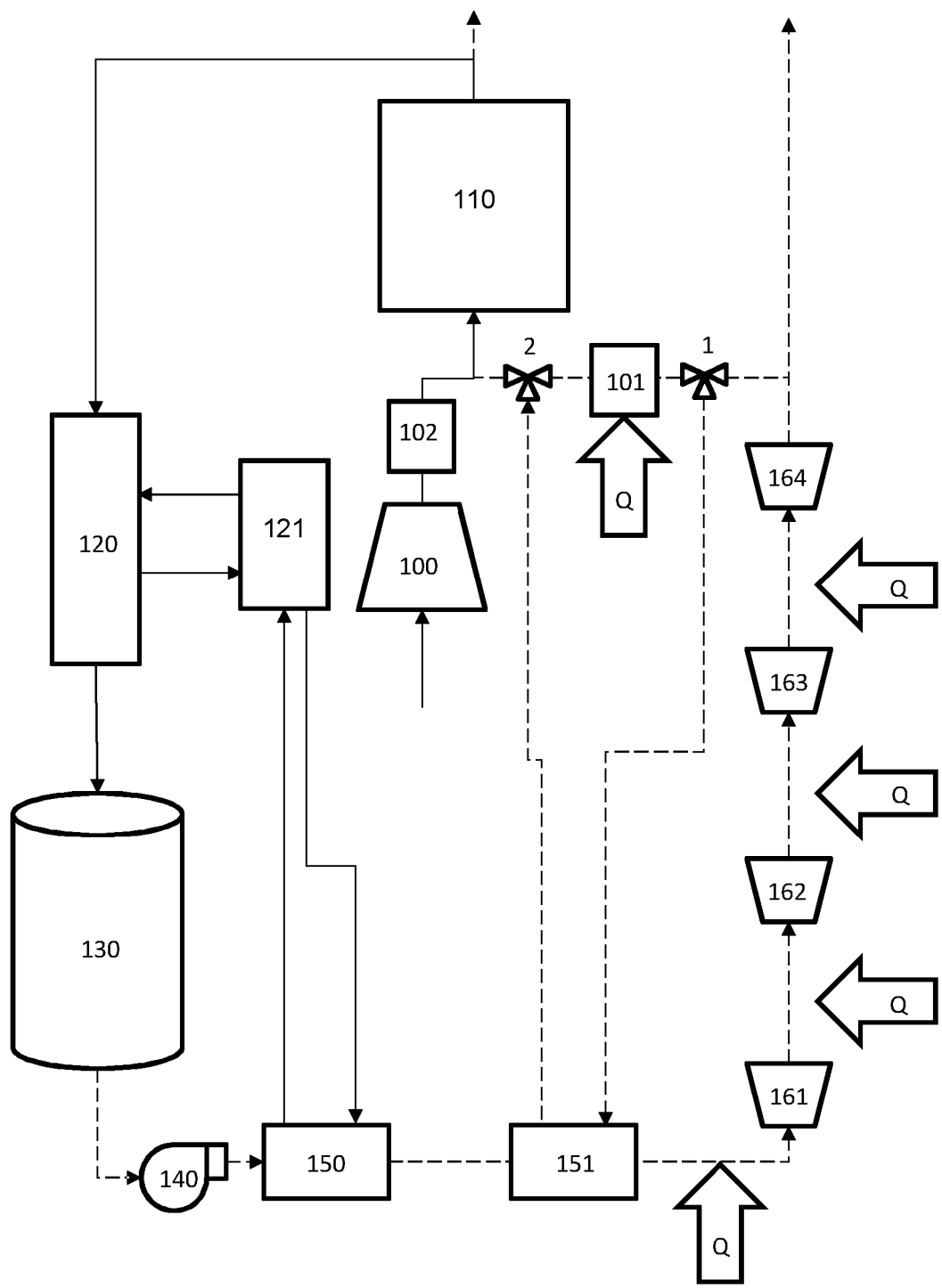
FIG. 7 is a schematic of a fourth embodiment of a liquid air energy storage system according to the first aspect of the invention.

A fourth embodiment of the first aspect of the invention is shown in FIG. 7. The third embodiment is identical to the second embodiment shown in FIG. 4, except for the following.

In the embodiment in FIG. 7, the second portion of the exhaust from the final expansion stage 164 is vented directly to atmosphere rather than being sent to evaporator, as with the embodiment in FIG. 4. However, as with the embodiment in FIG. 4, the first portion of the exhaust from the final expansion stage 164 is vented separately to atmosphere after leaving the APU.

In the embodiment in FIG. 7, cold from the evaporator 150 is conveyed to the cold store 121 in a separate thermal transfer loop, rather than being exhausted to atmosphere, as with the embodiment in FIG. 4.

In addition, the embodiment in FIG. 7 further comprises a first valve means 1 and a second valve means 2 upstream and downstream of heating device 101, respectively; and a heat exchanger 151 with a flow path from the first valve means 1, through the heat exchanger 151 to the second valve means 2.

Valve means 1 and 2 may be operated so that:
  during a first period of regeneration, the first portion of the exhaust from the final expansion stage 164 passes through heating device 101, where it is heated, and is then directed to the APU to regenerate the adsorbent; and
  during a second period of regeneration, the first portion of the exhaust from the final expansion stage 164 bypasses heating device 101 and passes through heat exchanger 151, where it is cooled, and then directed to the APU to cool the adsorbent.

Heat exchanger 151 is situated downstream of the evaporator 150. At the outflow of the evaporator 150, the air flow to the expansion stages may be moderately cold. For example it may be available at 15 deg C. Thus when the second portion of the exhaust from the final expansion stage 164 passes through heat exchanger 151 during the second period of regeneration, it may therein be cooled to moderately low temperature, for example 20 deg C., which is sufficient for cooling of the APU. The heat in the second portion of the exhaust from expansion stage 164 serves to preheat the air entering into expansion stage 161, thus recovering residual heat.

In a variation of the fourth embodiment (not shown), all the exhaust from expansion stage 164 may pass through heat exchanger 151 before being split into the first and second portions, such that a greater quantity of the residual heat available in the exhaust is recycled.

A second preferred operation of the LAES device will now be described with reference to the fourth embodiment of first aspect of the invention, as shown in FIG. 7.

The LAES system shown in FIG. 7, operates with a different charging and discharging regime on different days. On weekdays, the system operates with an 8-hour charge phase and a 4-hour discharge phase. On weekends, the system operates with a 12-hour charge phase and a 2-hour discharge phase. During the charge phase, air is drawn in from ambient at a flow rate of approximately 15 kg/s, compressed in compression means 100 to 10 bar, cooled to ambient temperature in cooler 102, and purified in APU 110. The resulting clean, dry air is sent to the cold box 120 to be liquefied and stored in cryogenic storage device 130.

During the discharge phase, liquid air from cryogenic storage device 130 is pumped to 120 bar absolute at a flow rate of approximately 30 kg/s, evaporated in evaporator 150 with the addition of heat (Q) to become clean, dry, high-pressure gaseous air at 120 bar and approximately ambient temperature.

This air stream is expanded in expansion stages 161, 162, 163 and 164, and is reheated between each stage to 400 deg C. An exhaust stream emerges from the final stage of expansion 164 at approximately 250 deg C.

In this embodiment, the process is such that:
during adsorption, it requires approximately 4 hours for the mass transfer zone to traverse the length of each vessel for the full 15 kg/s flow; and
during regeneration, at a flow rate of 7.5 kg/s through a vessel (25% of the total exhaust mass flow rate), it requires 1 hour for the mass transfer zone to traverse the length of the vessel; and assuming a constant mass flow rate a further hour to cool the adsorbent bed.

The exhaust stream is then split into a first and a second portion. The first portion is exhausted to atmosphere and the second portion is used to regenerate the APU.

At the start of the discharge phase, the first portion is flowed through APU 110 to regenerate the adsorbent material of said APU. Heating device 101 is not utilised as the temperature of the stream is already sufficient.

Once APU 110 has been regenerated, valve means 1 and 2 are operated such that the first portion is diverted to heat exchanger 151, where it is cooled to approximately 20 deg C. The now cooler second portion flows through the APU and cools the adsorbent bed.

It will be recognised that in the above system, the shorter charging duration on weekdays means that some of the adsorbent of the APU will not be used on weekdays. To illustrate this, and the usefulness of the possibility of adsorbing or regenerating only a subset of the vessels, two different regenerating regimes will now be described based on the second preferred operation of the LAES device with reference to the fourth embodiment of first aspect of the invention, as shown in FIG. 7.

According to a first regime the APU comprises four vessels and flow may be directed through subsets of these vessels in series or parallel, according to the above teachings. During the discharge phase, the second portion of the exhaust stream is substantially fixed at 50% of the total exhaust flow—approximately 15 kg/s. It is therefore possible to regenerate 2 vessels in 2 hours and 4 vessels in 4 hours.

At the beginning of the weekend, all four vessels are regenerated. At the end of the first 12-hour charging phase, three vessels are saturated and one vessel remains clean. At the end of the first 2-hour discharging phase, one vessel is saturated and three vessels are clean. Following the second 12-hour discharge, all four vessels are saturated. Following the second 2-hour discharge phase, two vessels are saturated and two vessels are clean.

At the beginning of the weekdays, two vessels are saturated. Following the first 8-hours charging phase, all four vessels are saturated. After the first 4-hour discharge, all four vessels are regenerated. For the remaining weekdays, the APU cycles between two clean vessels at the end of the 8-hour charging phase and four clean vessels at the end of the 4-hour discharging phase.

According to a second regime the APU comprises three vessels and flow may be directed through subsets of these vessels in series or parallel, according to the above teachings. During the discharge phase, the second portion of the exhaust stream may vary between 25% and 75% of the total exhaust flow—approximately 7.5 kg/s to 22.5 kg/s. It is therefore possible to regenerate up to 3 vessels in 2 hours and 6 vessels in 4 hours.

At the beginning of the weekend, all three vessels are regenerated. At the end of the first 12-hour charging phase, all three vessels are saturated. During the first 2-hour discharging phase, the second portion of the exhaust comprises 75% of the total exhaust flow. At the end of the first 2-hour discharging phase, all three vessels are clean. Following the second 12-hour discharge, all three vessels are saturated. During the second 2-hour discharging phase, the second portion of the exhaust also comprises 75% of the total exhaust flow. Following the second 2-hour discharge phase, all three vessels are clean.

At the beginning of the weekdays, all vessels are clean. Following the first 8-hours charging phase, two vessels are saturated. During the first 4-hour discharging phase, the second portion of the exhaust comprises 25% of the total exhaust flow. After the first 4-hour discharge, two vessels are regenerated. For the remaining weekdays, the APU cycles between one clean vessel at the end of the 8-hour charging phase and three clean vessels at the end of the 4-hour discharging phase.

The advantage of said second regime is that it allows the number of vessels and the quantity of adsorbent to be reduced. The use of variable regeneration flow does however imply more complexity in the system.

A person skilled in the art will understand how to connect the vessels in parallel subsets in order to achieve the above regimes for regeneration during variable length discharge phases.

A third preferred operation of the fourth embodiment of the LAES device, as shown in FIG. 7, is identical to the second except the air stream is heated to 275 deg C. between stages 161, 162, 163 and 164. The exhaust stream is at 140 deg C. In this case, at the start of the discharge phase, heating device 101 is used to increase the temperature of the first portion to 250 deg C. before it is used to regenerate the APU. The heat required for this may be derived from the same source as is used to reheat the air steam between stages 161, 162, 163 and 164.

Figure 8:
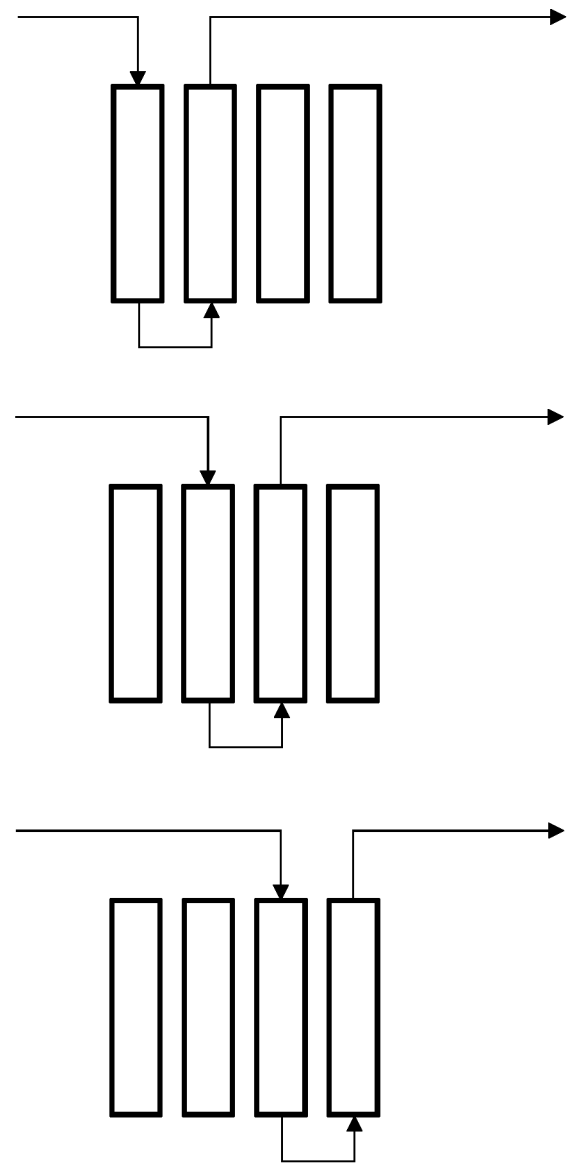
FIG. 8 is a schematic of an adsorption process in an APU according to a first embodiment of the second aspect of the invention.
Figure 9:
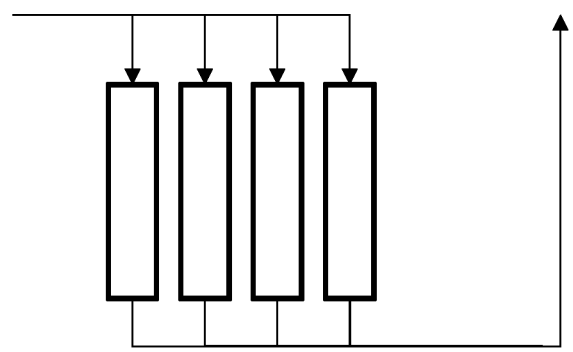
FIG. 9 is a schematic of a desorption process in the APU of FIG. 8.

A first embodiment of the second aspect of the invention is shown in FIGS. 8 and 9. In this embodiment, the APU comprises multiple adsorbent vessels connected by a multitude of conduits and valves such that they may be variously switched into parallel and series configurations. More specifically, different arrangements are used for adsorption and regeneration.

It should be noted that the arrows shown in FIGS. 8 to 14 are schematic and for understanding the underlying principles of the invention. They do not imply any physical direction through the vessels.

FIG. 8 shows the adsorption phase of the APU of the first embodiment of the second aspect of the invention. As can be seen, the adsorbent material of the APU is divided into four vessels. Adsorption takes place as follows. At first, the first and second vessels are fluidly connected in series, such that the fluid stream flows from a first fluid opening in the APU (i.e. a fluid input) through the first and second vessels to a second fluid opening in the APU (i.e. a fluid output). At this time, the remaining vessels (i.e. third and fourth) are fluidly unconnected from the fluid stream.

The mass transfer zone traverses the first and second vessels at a given velocity. When the mass transfer zone has traversed the first vessel and entered the second vessel, the first vessel is disconnected from the process stream and the third vessel is connected in series with the second. Now, the fluid stream flows from the first fluid opening, through the second and third vessels to the second fluid opening.

When the mass transfer zone has traversed the second vessel and entered the third vessel, the second vessel is disconnected from the process stream and the fourth vessel is connected in series with the third. Now, the fluid stream flows from the first fluid opening, through the third and fourth vessels to the second fluid opening.

It should be noted that if it takes time T for the mass transfer zone to traverse one vessel, it takes approximately time 4T to traverse all 4 vessels.

The vessels which are outside of the mass transfer zone are fluidly unconnected from the process stream, thus reducing the pressure drop across the APU. This scheme allows the pressure drop experienced by the process stream to be reduced even for a large quantity of adsorbent material, while maintaining the required flow conditions within the vessel.

If the contaminant concentration at the outflow of the APU is important, it is preferable to stop the flow when the mass transfer zone is situated at the extremity of the fourth vessel. This region of the vessel will not be fully saturated. However, the first three vessels will be fully saturated over their entire length.

FIG. 9 shows the desorption phase of the APU of the first embodiment of the second aspect of the invention. Here, the same arrangement of four vessels is shown, but the four vessels are fluidly connected in a parallel configuration.

Assuming that the flow velocity within each column is the same (quadruple the total volume flow rate) and the mass transfer zone traverses the vessels at the same velocity, it takes time T to traverse one vessel and the same time T to traverse all four vessels. Thus, all four vessels may be regenerated during the desorption phase in approximately one quarter of the time required to saturate them during in adsorption phase described previously in connection with FIG. 8, while maintaining the same the same flow conditions within each vessel.

It will be understood that the four vessels may be switched from the configuration shown in FIG. 8 to the configuration shown in FIG. 9 by an appropriate series of valves at each end of each vessel. The valves may be controlled by a controller, as would be understood by a person skilled in the art. Thus, the controller may control the valves to open and close so as to selectively provide the configurations shown in FIG. 8 and FIG. 9.

Although this embodiment has been described in the context of a preferred adsorption/desorption processes, it will be understood that the process described with reference to FIG. 8 (i.e. the series configuration) may be used for either adsorption or desorption where a minimal pressure drop is required, whilst the process described with reference to FIG. 9 (i.e. the parallel configuration) may be used for either adsorption or desorption where relatively fast purification or regeneration process is required.

It will also be appreciated that any number of vessels may be used in the APU. It will also be appreciated that any subset of those vessels may be connected to the process stream in series (for example one or three vessels may be fluidly connected in series rather than two, such that the fluid stream flows from the first fluid opening in the APU through the first, second and third vessels to the second fluid opening in the APU, and so on). It will also be appreciated that any subset of those vessels may be connected to the process stream in parallel.

A skilled person will thus recognise that the arrangement of multiple vessels in series and parallel configurations according to the above teachings provides a means to adapt the APU to different durations of the adsorption and regeneration phases, as imposed by the charge and discharge phases of a LAES system. This may be achieved while minimising the pressure drop across the APU maintaining correct flow conditions.

Furthermore, a skilled person will recognise that by switching between configurations such that one configuration is used during charging of the LAES system (adsorption phase of the APU) and another during discharging (regeneration of the APU), it is possible to optimise for the different requirements of each phase.

Figure 10:
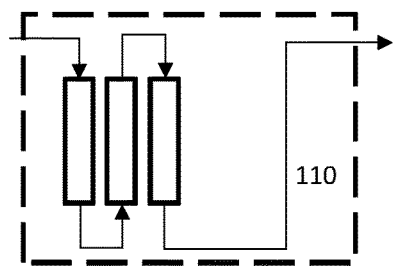
FIG. 10 is a schematic of an adsorption process in an APU according to a second embodiment of the second aspect of the invention.

A preferred operation of an APU according to the invention in the system shown in FIG. 6 (i.e. having a 12-hour charge phase and a 4-hour discharge phase) will now be described with reference to the second embodiment of second aspect of the invention, as shown in FIGS. 9 and 10. In this embodiment, the APU comprises 3 equal-sized adsorption vessels with the adsorption bed equally distributed between them. In this embodiment, the process is such that:

the flow velocity for regeneration is approximately the same as the flow velocity for adsorption in order to avoid fluidization of the adsorbent;

at said velocity, during adsorption, it requires approximately 4 hours for the mass transfer zone to traverse the length of each vessel; and at said velocity, during regeneration it requires 2 hours for the mass transfer zone to traverse the length of each vessel; and assuming a constant mass flow rate a further 2 hours to cool the adsorbent bed.

FIG. 10 shows the APU during a charge phase of an LAES in which the APU is provided (such as the LAES of any one of FIGS. 3 to 5, for example), when the APU operates in its absorption phase. During the charge/adsorption phase, compressed ambient air flows at 10 bar, ambient temperature and a flow rate of 10 kg/s from compression device (not shown) through the 3 vessels of the APU 110 arranged in series. The corresponding cross-sectional flow area is s, the mass flow is 10 kg/s, the superficial flow velocity is u and the adsorption time is 12 hours.

In the above example, for the purposes of illustration the APU is described with an operating pressure of 10 bar during adsorption. The skilled person will recognise that the specific operating pressure essential to the invention but may be selected based on the specific design of any given APU. Typical operating values during the adsorption phase range between 4 and 12 bar and more preferably between 7 and 9 bar. However, in a pressure swing system or combined pressure/temperature swing system, it is highly preferable that the adsorption pressure be higher than the regeneration pressure in order to maximise the differential in adsorbent capacity between the adsorption and regeneration phases.

Figure 11:
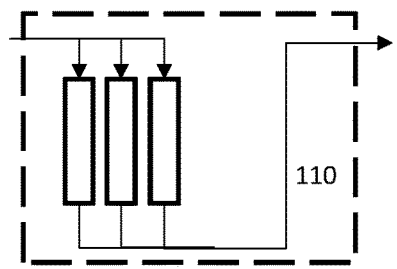
FIG. 11 is a schematic of a desorption process in the APU of FIG. 10.

FIG. 11 shows the APU during a discharge phase of the LAES, when the APU operates in its desorption phase. During the first 2 hours of the discharge phase, around 10% (3 kg/s) of the exhaust stream forms the first portion. This clean, dry air flows at around 1.2 bar absolute and 200° C. through heating device 101, where it is heated, and then through the 3 vessels of APU 110 fluidly connected in parallel. The corresponding cross-sectional flow area is 3 s and the mass flow is 1 kg/s per vessel.

At this lower pressure and higher temperature, the first portion of the exhaust stream is approximately 10 times less dense than the compressed ambient air stream during the charging phase. The corresponding superficial flow velocity is approximately u and the regeneration time is 2 hours per vessel and 2 hours in total.

During the third and fourth hours of the discharge phase, reheat Q2 is removed and heating device 101 is turned off. The resulting lower temperature stream flows through the 3 vessels of APU 110 fluidly connected in parallel so as to cool the adsorbent material within them.

A skilled person will recognise that the embodiment described above is particular advantageous over state of the art systems. For instance, if the vessels where arranged in series during regeneration, it would require 6 hours for the mass transfer zone to traverse the three vessels. However, the exhaust stream from the power recovery unit would only be available for 4 of the 6 hours, which would not be enough time.

Furthermore, if the vessels were arranged in parallel during adsorption, there would be a larger portion of the adsorbent which was not fully saturated due to the existence of concentration gradients at the extremity of each vessel at the end of the adsorption phase.

Figure 12:
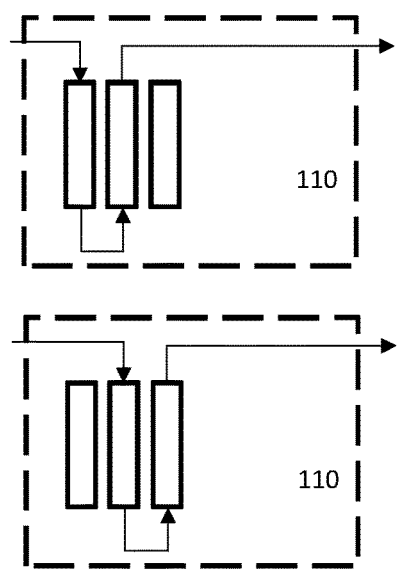
FIG. 12 is a schematic of an alternative adsorption process in the APU of FIG. 10.

FIG. 12 shows an alternative adsorption process which is identical to the embodiments described above and shown in FIGS. 10 and 11, except the charge phase operates as follows. At first, the compressed ambient air stream flows at 10 bar and 18° C. at a flow rate of 10 kg/s from cooler 102 through the first two of the three vessels of APU 110 fluidly connected in series. When the first vessel reaches the saturation threshold, it is disconnected from the process stream and the third vessel is connected in series with the second. This charge/adsorption phase is particularly advantageous because length of the bed in the flow at any one time is reduced by a third, and so too is the associated pressure drop.

Figure 13:
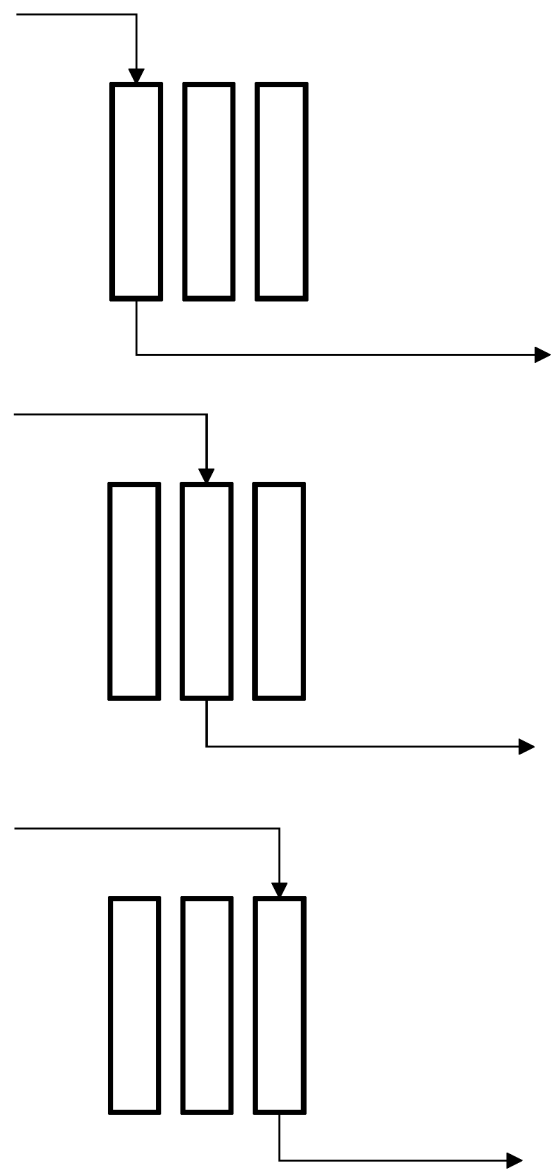
FIG. 13 is a schematic of an alternative adsorption process in the APU of FIG. 10.
Figure 14:
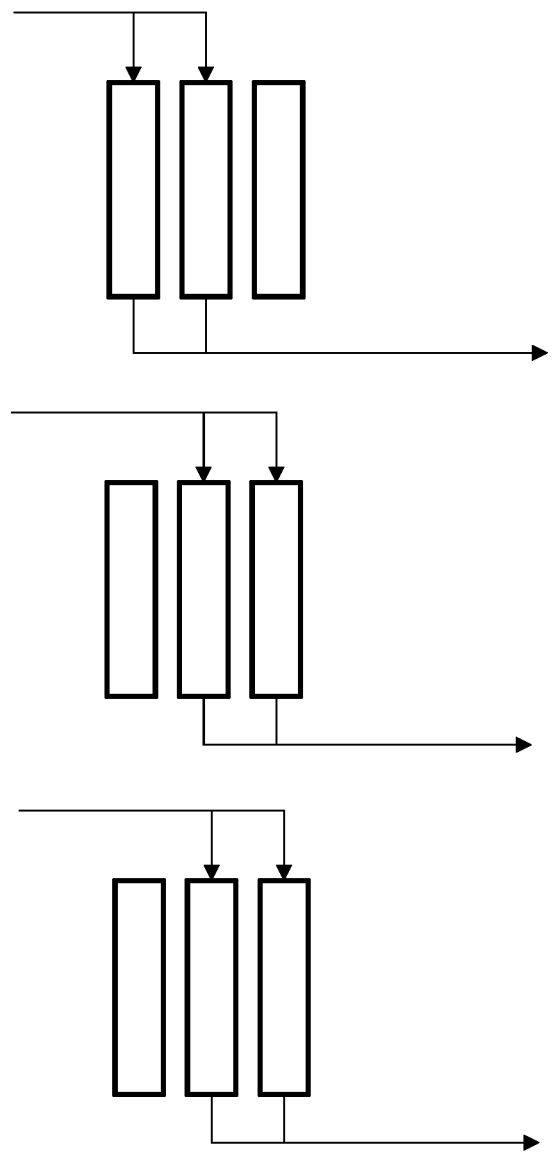
FIG. 14 is a schematic of an alternative desorption process in the APU of FIG. 10.

FIG. 13 shows an alternative adsorption process which is identical to the embodiments described above and shown in FIGS. 10 to 12, except the charge phase operates as follows. At first, the compressed ambient air stream flows at 10 bar and 18° C. at a flow rate of 10 kg/s from cooler 102 through the first of the three vessels of APU 110. When the first vessel reaches the saturation threshold, it is disconnected from the process stream while the second vessel is connected to the flow. When the second vessel reaches the saturation threshold, it is disconnected from the process stream while the third vessel is connected to the flow. This charge/adsorption phase is particularly advantageous because length of the bed in the flow at any one time is reduced by two thirds, as is the associated pressure drop. Moreover, fewer valves and less pipework may be used.

In a further alternative arrangement, the system comprises six adsorption vessels of half the length as the embodiments described in FIGS. 10 to 12. The time required for the mass transfer zone to traverse the length of one vessel of this arrangement is 1 hour. During the first hour of discharge, the regeneration stream flows through three of the six vessels in parallel. Once these vessels are regenerated, the regeneration stream flows through the remaining three vessels. Finally (and with reference to the LAES of FIG. 6) the cycle is repeated with reheat Q2 removed and heating device 101 turned off or bypassed to provide cooling to the vessels. The advantage of this arrangement is that effective length of the bed is reduced by half during the discharge phase and the pressure drop is reduced by approximately one half. The pressure differential across the expansion stages may be maximised and the work produced may thus be increased.

A skilled person will appreciate that modifications may be made to the embodiments disclosed herein within the scope of the invention, which is defined by the appended claims.

The invention claimed is:

1. A liquid air energy storage system, comprising:
   an air liquefier comprising:
      an air input having a compressor configured to compress input air and a cooler configured to cool the input air;
      an adsorption air purification unit coupled to the air input and configured to purify the compressed and cooled input air from the air input; and
      a cold box coupled to the adsorption air purification unit and configured to liquefy the purified air from the adsorption air purification unit;
   a liquid air storage facility for storing the liquefied air from the air liquefier;
   a power recovery unit coupled to the liquid air storage facility comprising:
      a pump configured to pressurize the liquefied air from the liquid air storage facility into a high-pressure liquefied air;
      an evaporator configured to transform the high-pressure liquefied air from the pump into high-pressure gaseous air;
      a heat exchanger for heating the high-pressure gaseous air from the evaporator;
      an expansion turbine coupled to the heat exchanger and capable of being driven by the heated high-pressure gaseous air from the heat exchanger;
      a generator coupled to the expansion turbine and configured to generate electricity from the expansion turbine;
      an exhaust coupled to the expansion turbine for exhausting a portion of a low-pressure gaseous air from the expansion turbine to an air output and
      an arrangement of valves configured for regenerating the adsorption air purification unit in two periods, such that during a first of the two periods, the arrangement of valves directs a portion of the low-pressure gaseous air exhausted from the expansion turbine through the adsorption air purification unit bypassing the heat exchanger for heating the adsorption air purification unit and during a second of the two periods, the arrangement of valves directs at least a portion of the low-pressure gaseous air exhausted from the expansion turbine through the heat exchanger and then through the adsorption air purification unit for cooling the adsorption air purification unit.

2. The liquid air energy storage system of claim 1, wherein the arrangement of valves is further configured to switch between a first state in which it enables the adsorption air purification unit to receive air from the air input and the cold box to receive purified air from the adsorption air purification unit; and a second state in which it enables the adsorption air purification unit to receive low-pressure gaseous air exhausted from the expansion turbine and the adsorption air purification unit to pass the low-pressure gaseous air to the air output.

3. The liquid air energy storage system of claim 2, wherein the system is operable in each of:
   a charging phase, wherein air is received at the air input, purified in the air purification unit, liquefied in the air liquefier and passed to the liquid air storage facility;
   a storage phase, wherein liquid air is stored in the liquid air storage facility; and
   a discharging phase, wherein liquefied air is passed from the liquid air storage facility to the power recovery unit, transformed into high pressure gaseous air, used to drive the expansion turbine, and exhausted through the exhaust.

4. The liquid air energy storage system of claim 3, wherein the arrangement of valves is in its first state whilst the system is in its charging phase and in its second state whilst the system is in its discharging phase.

5. The liquid air energy storage system of claim 3, wherein the system is operable in each of the charging phase, storage phase and discharging phase singly and consecutively.

6. The liquid air energy storage system of claim 1, further comprising a heating device between the adsorption air purification unit and the exhaust.

7. The liquid air energy storage system of claim 6, wherein the heating device is one of:
an electrical heater; and
a heat exchanger coupled to a source of heat.

8. The liquid air energy storage system of claim 3, further comprising a thermal store configured to receive heat from the compressor of the air input and/or the cold box of the air liquefier during the charging phase.

9. The liquid air energy storage system of claim 8, wherein the thermal store is configured to transfer heat to the evaporator of the power recovery unit during the discharging phase.

10. The liquid air energy storage system of claim 3, further comprising a cold store configured to transfer cold energy to the cold box of the liquefier during the charging phase.

11. The liquid air energy storage system of claim 10, wherein the cold store is configured to receive cold energy from the evaporator of the power recovery unit during the discharging phase.

12. The liquid air energy storage system of claim 1, wherein the exhaust is configured to pass a first portion of the low-pressure gaseous air to the adsorption air purification unit and pass the remaining low-pressure gaseous air to the air output.

13. The liquid air energy storage system of claim 1, wherein the air output is vented to atmosphere.

14. The liquid air energy storage system of claim 10, wherein the air output is coupled to the cold store via the evaporator such that the low-pressure gaseous air exhausted from the expansion turbine is cooled and then transfers cold to the cold store.

15. The liquid air energy storage system of claim 1, further comprising:
a heat exchanger;
a first fluid pathway passing from the exhaust of the expansion turbine through the heat exchanger to the input of the adsorption air purification unit; and
a second fluid pathway passing from the output of the evaporator through the heat exchanger to the input of the expansion turbine;
wherein the heat exchanger is configured to permit the exhaust from the expansion turbine to be cooled by the high-pressure gaseous air from the evaporator before regenerating the adsorption air purification unit.

16. The liquid air energy storage system of claim 15, further comprising a third fluid pathway passing from the exhaust of the expansion turbine through a heating device to the input of the adsorption air purification unit, and the arrangement of valves being configured to switch between a first state in which it directs exhaust from the expansion turbine along the first fluid pathway and a second state in which it directs exhaust from the expansion turbine along the third fluid pathway.

17. A method of operating a liquid air energy storage system, comprising:
liquefying a stream of input air by:
receiving the stream of input air through an air input, compressing the input air and cooling the input air;
purifying the stream of input air in an adsorption air purification unit to produce a stream of purified air; and
liquefying the stream of purified air in a cold box;
storing the liquefied air in a liquid air storage facility; and
recovering power from the liquefied air by:
pressurizing the liquefied air with a pump to produce a stream of high-pressure liquefied air;
evaporating the stream of high-pressure liquefied air in an evaporator to produce a stream of high-pressure gaseous air;
heating the stream of high-pressure gaseous air to produce a stream of heated high-pressure gaseous air;
expanding the stream of heated high-pressure gaseous air in an expansion turbine;
generating electricity in a generator coupled to the expansion turbine; and
exhausting a stream of low-pressure gaseous air from the expansion turbine; and
regenerating the adsorption air purification unit using at least a portion of the stream of low-pressure gaseous air exhausted from the expansion turbine,
wherein the step of regenerating takes place in two periods such that during a first of the two periods, an arrangement of valves directs a portion of the low-pressure gaseous air exhausted from the expansion turbine through the adsorption air purification unit bypassing the heat exchanger for heating the adsorption air purification unit and during a second of the two periods, the arrangement of valves directs at least a portion of the low-pressure gaseous air exhausted from the expansion turbine through the heat exchanger and then through the adsorption air purification unit for cooling the adsorption air purification unit.

18. The method of claim 17, the arrangement of valves switches between a first state, in which it allows the step of purifying the stream of input air in the adsorption air purification unit to take place, and a second state, in which it allows the step of regenerating the adsorption air purification unit to take place.

19. The method of claim 18, wherein the steps of liquefying a stream of input air; storing the liquefied air; and recovering power from the liquefied air take place singly and consecutively.

20. The method of claim 17, further comprising the step of heating the at least a portion of the stream of low-pressure gaseous air exhausted from the expansion turbine prior to it regenerating the adsorption air purification unit.

21. The method of claim 17, further comprising the step of transferring heat generated by compressing the stream of input air and/or by liquefying the stream of purified air to a thermal store.

22. The method of claim 21, further comprising the step of transferring heat from the thermal store to the evaporator to evaporate the stream of high-pressure liquefied air.

23. The method of claim 17, further comprising the step of transferring cold generated evaporating the stream of high-pressure liquefied to a cold store.

24. The method of claim 23, further comprising the step of transferring cold from the cold store to the cold box for liquefying the stream of purified air.

25. The method of claim 17, further comprising the step of passing a first portion of the low-pressure gaseous air to the adsorption air purification unit, and passing the remaining low-pressure gaseous air to an air output.

26. The method of claim 25, further comprising the step of venting the remaining low-pressure gaseous air in the air output to atmosphere.

27. The method of claim 25, further comprising the step of directing the first portion of the low-pressure gaseous air through a heat exchanger for cooling the first portion of the low-pressure gaseous air before passing the first portion of the low-pressure gaseous air to the adsorption air purification unit.

28. An adsorption air purification device for use in a liquid air energy storage system, the device comprising:
 first and second fluid openings;
 at least two adsorbent vessels connected between the first and second fluid openings;
 an arrangement of conduits and valves configured to direct a first stream of air to pass through a combination of one or more of the adsorbent vessels to remove contaminants from the first stream of air, and to direct a second stream of air to pass through the combination of one of more of the adsorbent vessels to regenerate the adsorbent vessels; and
 a controller configured to open and close said valves;
 wherein the arrangement of conduits and valves is such that the controller may open and close said valves so as to selectively direct:
  a) the first stream of air to pass between the first and second fluid openings through at least a first adsorbent vessel in series during a first phase of operation; and
  b) the second stream of air to pass between the first and second fluid openings through at least the first and a second adsorbent vessel in parallel during a separate second phase of operation.

29. The adsorption air purification device of claim 28, wherein the arrangement of conduits and valves is such that the controller may open and close said valves so as to selectively direct:
 a) the first stream of air to pass between the first and second fluid openings through two or more of the adsorbent vessels in series; and
 b) the second stream of air to pass between the first and second fluid openings through the said two or more of the adsorbent vessels in parallel.

30. The air purification device of claim 28, wherein the at least two adsorbent vessels connected between the first and second fluid openings includes first and second adsorbent vessels, wherein the arrangement of conduits and valves is such that the controller may open and close said valves so as to direct the first stream of air to pass:
 a) between the first and second fluid openings through only the first adsorbent vessel; and subsequently
 b) between the first and second fluid openings through only the second adsorbent vessel.

31. The air purification device of claim 28, wherein the at least two adsorbent vessels connected between the first and second fluid openings includes first, second and third adsorbent vessels, wherein the arrangement of conduits and valves is such that the controller may open and close said valves so as to direct the first stream of air to pass:
 a) between the first and second fluid openings through only the first adsorbent vessel; and subsequently
 b) between the first and second fluid openings through only the second adsorbent vessel; and subsequently
 c) between the first and second fluid openings through only the third adsorbent vessel.

32. The air purification device of claim 28, wherein the arrangement of conduits and valves is such that the controller may open and close said valves so as to direct the second stream of air to pass between the first and second fluid openings through only a first subset of the at least two adsorbent vessels in parallel; and subsequently through only a second subset of the at least two adsorbent vessels in parallel.

33. The air purification device of claim 32, wherein the first and second subsets have no adsorbent vessels in common.

34. A liquid air energy storage system, comprising:
 an air liquefier comprising an air input having a compressor and a cooler, an adsorption air purification device according to claim 28, and a cold box;
 a liquid air storage facility; and
 a power recovery unit comprising a pump, an evaporator, an expansion turbine, a generator and an exhaust;
 wherein the system is selectively operable in each of:
  a charging phase, wherein air is received at the air input, purified in the air purification unit, liquefied in the air liquefier and passed to the liquid air storage facility;
  a storage phase, wherein liquid air is stored in the liquid air storage facility; and
  a discharging phase, wherein liquefied air is passed from the liquid air storage facility to the power recovery unit, transformed into high pressure gaseous air, used to drive the expansion turbine, and exhausted through the exhaust;
 wherein the arrangement of conduits and valves in the adsorption air purification device is arranged such that the first stream of air is provided by the air received at the air input and the second stream of air is provided by at least a portion of the air exhausted through the exhaust; and
 wherein the controller is configured to open and close said valves so as to selectively direct:
  a) the air received at the air input to pass between the first and second fluid openings through at least a first adsorbent vessel in series during the charging phase; and
  b) the at least a portion of the air exhausted through the exhaust to pass between the first and second openings through at least the first and a second adsorbent vessel in parallel during the discharging phase.

35. A method of operating an adsorption air purification device having first and second fluid openings and at least two adsorbent vessels connected between the first and second fluid openings, the method comprising:
 passing a first stream of air through a combination of one or more of the adsorbent vessels to remove contaminants from the first stream by passing the first stream of air between the first and second fluid openings through two or more of the adsorbent vessels in series; and
 passing a second stream of air through the combination of one or more of the adsorbent vessels to regenerate the vessels by passing the second stream of air between the first and second fluid openings through the said two or more of the adsorbent vessels in parallel.

36. The method of claim 35, further comprising the steps of passing the second stream of air between the first and second fluid openings through only a first subset of the at least two adsorbent vessels in parallel; and subsequently through only a second subset of the at least two adsorbent vessels in parallel.

37. The method of claim 36, wherein the first and second subsets have no adsorbent vessels in common.

\* \* \* \* \*